United States Patent
Tirimacco

(10) Patent No.: US 11,466,409 B2
(45) Date of Patent: Oct. 11, 2022

(54) MULTI-PLY TISSUE PRODUCT PRODUCED FROM A SINGLE PLY TISSUE WEB

(71) Applicant: Kimberly-Clark Worldwide, Inc., Neenah, WI (US)

(72) Inventor: Maurizio Tirimacco, Minneapolis, MN (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

(21) Appl. No.: 17/048,849

(22) PCT Filed: Apr. 27, 2018

(86) PCT No.: PCT/US2018/029849
§ 371 (c)(1),
(2) Date: Oct. 19, 2020

(87) PCT Pub. No.: WO2019/209321
PCT Pub. Date: Oct. 31, 2019

(65) Prior Publication Data
US 2021/0238808 A1    Aug. 5, 2021

(51) Int. Cl.
*D21H 27/38*    (2006.01)
*D21H 11/04*    (2006.01)
(Continued)

(52) U.S. Cl.
CPC .............. *D21H 27/38* (2013.01); *D21H 11/04* (2013.01); *D21H 17/07* (2013.01); *D21H 25/14* (2013.01); *D21H 27/002* (2013.01); *D21H 27/32* (2013.01)

(58) Field of Classification Search
CPC ........ D21H 27/38; D21H 11/04; D21H 17/07; D21H 25/14; D21H 27/002; D21H 27/32; D21H 27/30; B32B 5/08; B32B 5/26; B32B 2250/05; B32B 7/02; B32B 29/005; B32B 2250/03; B32B 2262/062;
(Continued)

(56) References Cited

U.S. PATENT DOCUMENTS 1,606,428 A * 11/1926 Kirschbraun ............ D21J 1/16
                                                       162/127
2,092,967 A    9/1937 Gay et al.
(Continued)

FOREIGN PATENT DOCUMENTS

CA    1107109 A  *  8/1981  ............. D21H 27/40
CA    1107109 A     8/1981
(Continued)

*Primary Examiner* — Jose A Fortuna
(74) *Attorney, Agent, or Firm* — Kimberly-Clark Worldwide, Inc.

(57) ABSTRACT

In general, the present invention is directed to a process for producing multi-ply tissue products from a single ply tissue web and the resulting multi-ply products, which have good softness and strength characteristics. The process of the present invention generally involves producing a first single ply tissue web and then splitting the web into two separate single ply tissue webs that can be converted into a multi-ply web. In certain preferred embodiments the single ply web may be manufactured such that when it is split into two separate webs the two webs are substantially identical.

16 Claims, 1 Drawing Sheet

(51) Int. Cl.
*D21H 17/07* (2006.01)
*D21H 27/00* (2006.01)
*D21H 25/14* (2006.01)
*D21H 27/32* (2006.01)

(58) Field of Classification Search
CPC .......... B32B 2262/067; B32B 2262/14; B32B 2307/54; B32B 2307/718; B32B 2307/732; B32B 2307/75; B32B 2535/00; B32B 2555/00; B32B 7/12; B32B 7/06; B29B 7/06; B29B 7/12
See application file for complete search history.

(56) References Cited

U.S. PATENT DOCUMENTS

| | | | |
|---|---|---|---|
| 5,397,435 | A | 3/1995 | Ostendorf et al. |
| 5,405,501 | A | 4/1995 | Phan et al. |
| 5,437,766 | A | 8/1995 | Van Phan et al. |
| 6,420,013 | B1 * | 7/2002 | Vinson .................. D21H 19/74 162/113 |
| 6,673,203 | B1 | 1/2004 | Neal, Jr. et al. |
| 7,303,650 | B2 * | 12/2007 | Hermans ................ D21F 11/14 162/112 |
| 7,422,658 | B2 * | 9/2008 | Hermans .............. D21H 27/005 162/112 |
| 7,862,686 | B2 | 1/2011 | Ward et al. |
| 8,282,776 | B2 | 10/2012 | Smith et al. |
| 8,834,978 | B1 | 9/2014 | Hermans et al. |
| 9,309,627 | B2 | 4/2016 | Miller et al. |
| 9,447,546 | B2 | 9/2016 | Goulet et al. |
| 9,657,444 | B2 | 5/2017 | Burazin et al. |
| 9,708,774 | B2 | 7/2017 | Lee et al. |
| 9,719,213 | B2 | 8/2017 | Miller, IV et al. |
| 9,896,804 | B2 * | 2/2018 | Goulet ................ D21H 27/005 |
| 2005/0145352 | A1 * | 7/2005 | Hermans ................ D21F 11/14 162/112 |
| 2013/0323453 | A1 * | 12/2013 | Hirasawa ............... D21H 23/48 428/43 |
| 2016/0362843 | A1 | 12/2016 | Hermans et al. |
| 2021/0238808 | A1 * | 8/2021 | Tirimacco ................ B32B 5/26 |

FOREIGN PATENT DOCUMENTS

| | | | | |
|---|---|---|---|---|
| CN | 103643593 | A | | 3/2014 |
| EP | 0003377 | A1 * | 8/1979 | ............. D21F 11/04 |
| EP | 0404189 | B1 | 11/1994 | |
| JP | 07317000 | A * | 12/1995 | ............. D21F 11/04 |
| WO | 07116720 | A1 | 10/2007 | |
| WO | WO-2007116720 | A1 * | 10/2007 | ............. D21H 27/30 |
| WO | WO-2012114927 | A1 * | 8/2012 | ............. D21H 23/48 |
| WO | WO-2019209321 | A * | 10/2019 | ............. B32B 7/02 |

* cited by examiner

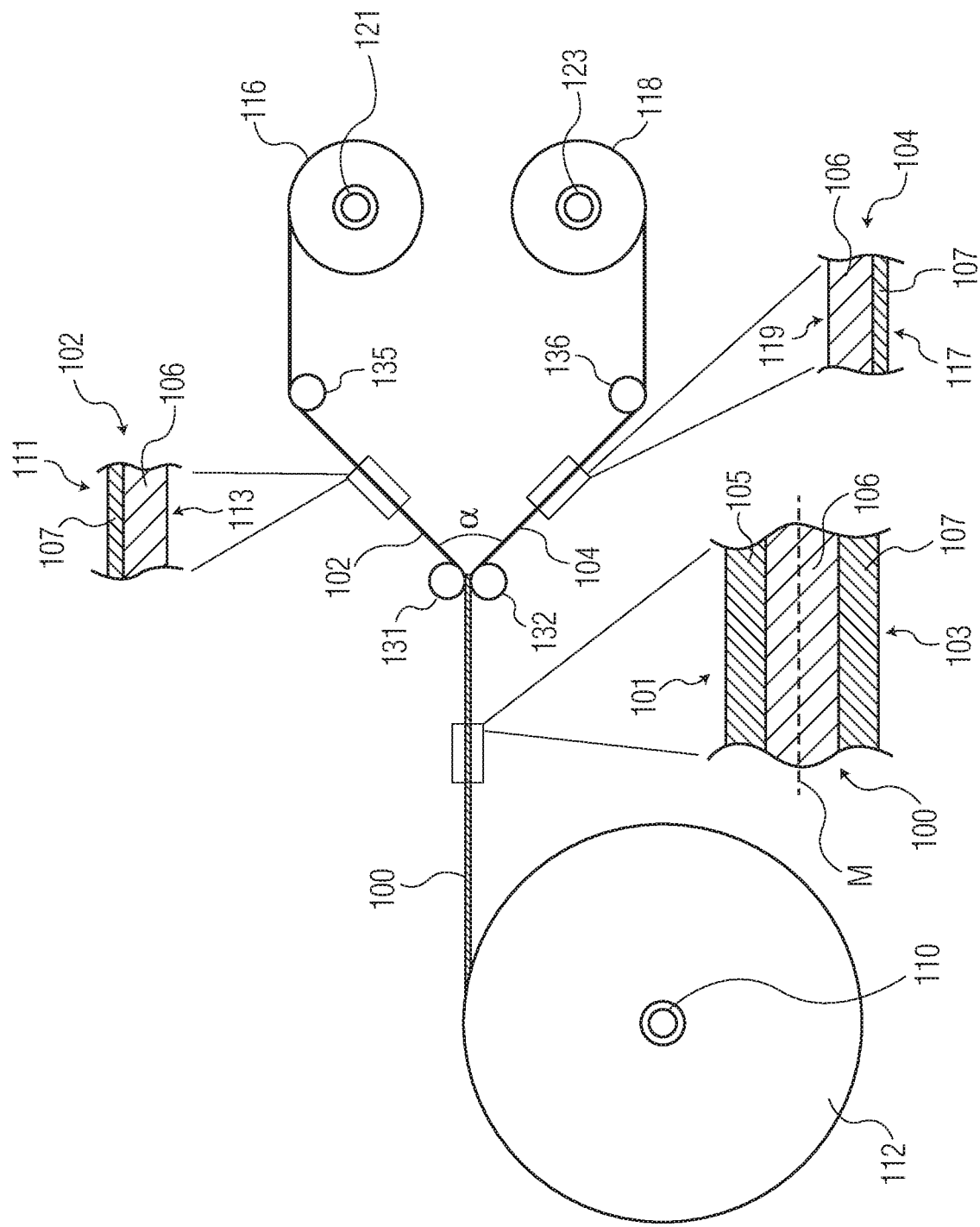

MULTI-PLY TISSUE PRODUCT PRODUCED FROM A SINGLE PLY TISSUE WEB

BACKGROUND

The production of tissue products generally begins with the production of a tissue basesheet from papermaking fibers using any one of the well-known manufacturing processes such as conventional wet press (CWP) manufacturing method, creped through-air drying (CTAD), uncreped through-air drying (UCTAD), and advanced tissue molding system (ATMOS). For example, the CWP manufacturing method includes the steps of dispersing a dilute slurry of papermaking fibers on a forming fabric to form a wet tissue web, pressing and dewatering the wet tissue web, adhering the dewatered tissue web onto a rotating heated cylinder to dry the web and then creping the dried web from the cylinder using a creping blade.

Once, the tissue basesheet has been manufactured it is processed by one or more converting operations to form the finished tissue product. During converting multi-ply tissue products are formed by combining several distinct basesheets, each of which has been individually manufactured by one of the foregoing tissue manufacturing processes. The distinct basesheets, also called plies, can be combined and processed in any number of different manners to produce a finished tissue product having consumer preferred properties. For example, two, three or four basesheets may be plied together to form a finished tissue product having a desired caliper, bulk, softness, absorption capacity and strength.

Distinct basesheets may be plied to together by chemical means, such as by adhesive bonding, or mechanical means, such as by crimping or embossing, or a combination of both. During adhesive bonding, a film of adhesive is deposited over some or all of the surface of one of the plies, then the adhesive-treated surface is placed in contact with the surface of at least one other ply. During the mechanical combination, the plies may be combined and passed through a nip comprising an embossed cylindrical roll which results in at least one of the plies having a particular relief or indentation. Further, embossing may increase ply caliper compared with its initial caliper.

While prior art processes for converting basesheet into multi-ply tissue products are capable of producing products having acceptable caliper, softness, bulkiness, absorption capacity and strength, the processes are dependent upon first manufacturing a single basesheet for each ply. The need to produce each ply independently on a tissue machine and then combine the plies into a finished product is costly and inefficient. Thus, there remains a need in the art for a method of manufacturing multi-ply tissue products that are more economical and that do not require manufacturing a single basesheet for each ply.

SUMMARY

The present inventors have now discovered a novel method for producing a multi-ply tissue product from a single ply basesheet. The method involves producing a single ply basesheet having a layered structure that makes the basesheet susceptible to splitting and then splitting the basesheet into two separate webs and converting the split webs into a multi-ply tissue product. Thus, the present invention is able to create a multi-ply tissue product from a single ply basesheet, which increases manufacturing productivity and reduces cost.

Accordingly, in one embodiment the present invention provides a method of manufacturing a multi-ply tissue product comprising the steps of providing a single ply tissue web having a plurality of layers and having a substantially horizontal plane, splitting the tissue web along the horizontal plane to yield a pair of split tissue webs and then combining the split tissue webs into a multi-ply tissue product.

In one embodiment the present invention provides a method for manufacturing a multi-ply tissue product comprising the steps of forming a first multi-layered tissue web comprising first and second fibrous outer layers and a middle fibrous layer disposed there between; splitting the first multi-layered tissue web horizontally to form a second and a third multi-layered tissue web, wherein the second and the third multi-layered tissue webs each comprise two layers; and plying the second and third multi-layered tissue webs together to form a multi-ply tissue product.

In other embodiments the present invention provides a method for manufacturing a two ply tissue product comprising the steps of: providing an uncreped through-air dried tissue web comprising first and second fibrous outer layers and a middle fibrous layer disposed there between; splitting the uncreped through-air dried web horizontally to form a second and a third multi-layered tissue web, wherein the second and the third multi-layered tissue webs each comprise two layers; and plying the second and third multi-layered tissue webs together to form a two ply tissue product.

In still other embodiments the present invention provides a method for manufacturing a multi-ply tissue product comprising the steps of: forming a first multi-layered through-air dried tissue web comprising first and second fibrous outer layers and a middle fibrous layer disposed there between; calendering the first multi-layered through-air dried tissue web by passing the web through a nip formed by a pair of opposed rolls, wherein the calendered web has a mean splitting force from about 100 to about 250 gf; splitting the first multi-layered tissue web horizontally to form a second and a third multi-layered tissue web, wherein the second and the third multi-layered tissue webs each comprise two layers; and plying the second and third multi-layered tissue webs together to form a multi-ply tissue product.

In certain embodiments the basesheet, also referred to herein as the first single ply tissue web, is a multi-layered tissue having a splitting force of less than about 250 gf, such as less than about 200 gf, such as less than about 150 gf, such as less than about 100 gf, and, in one embodiment, from about 50 to about 250 gf, such as from about 100 to about 200 gf. The splitting force may be reduced by providing the multi-layered tissue web with a middle fibrous layer that is weaker than the adjacent fibrous outer layers. For example, the middle fibrous layer may be formed from a fiber furnish that has relatively poor inter-fiber bonding such as high coarseness cellulosic fibers. In certain embodiments high coarseness cellulose fibers are selected from a group consisting of recycled fibers, chemi-thermomechanical fibers, Southern softwood kraft fibers and mixtures thereof.

In other embodiments the basesheet may comprise a multi-layered web where the middle fibrous layer comprises a debonder selected from the group consisting of quaternary ammonium compounds, mixtures of quaternary ammonium compounds with polyhydroxy compounds, and modified polysiloxanes. In particularly preferred embodiments the middle fibrous layer may comprise Southern softwood kraft pulp fibers and a debonder selected from the group consisting of quaternary ammonium compounds, mixtures of quaternary ammonium compounds with polyhydroxy compounds, and modified polysiloxanes, wherein the debonder is added at about 5.0 to about 15.0 kg per tonne of fiber forming the middle fibrous layer of the web.

In certain preferred embodiments the basesheet is multi-layered and comprises a middle fibrous layer that is weaker than the fibrous outer layers and has been manufactured without compressive dewatering. For example, the basesheet may be an uncreped through-air dried tissue web having first and second fibrous outer layers comprising refined low-coarseness pulp fibers and the middle fibrous layer may comprise high coarseness pulp fibers, where the basesheet has a splitting force of less than about 250 gf, such as less than about 200 gf, such as less than about 150 gf, such as less than about 100 gf, and, in one embodiment, from about 50 to about 250 gf.

In another embodiment the invention provides a multi-layered tissue web consisting of five layers where the two outermost layers comprise a first fiber furnish, the two inner layers adjacent to the two outermost layers comprise a second, different, fiber furnish and the middle fibrous layer comprises a third, different, fiber furnish. The five layered web may have a splitting force of less than about 250 gf, such as from about 50 to about 250 gf and may be split horizontally substantially about the mid-point of the web to produce second and third multi-layered webs each having three layers. The second and third multi-layered webs may then be converted using conventional converting techniques such as plying, embossing and winding to produce a two ply tissue product.

When tissue webs made according to the present invention are split horizontally to create two separate tissue webs, the resulting tissue webs may have similar physical properties, such as basis weight, caliper, sheet bulk or tensile strength. For example, the basis weight of the two webs may vary by no more than about 10 percent, such as no more than about 5 percent. In other embodiments the physical structure of the webs may be similar. For example, the webs may comprise the same number of layers and the fiber furnish making up the layers may be substantially similar. Further, in other instances, the respective surfaces, such as the two outer surfaces, may be substantially similar. For example, the first outer surfaces may have similar textures and surface treatments and the second outer surfaces may have similar textures and surface treatments.

DESCRIPTION OF THE DRAWINGS

FIG. 1 is a schematic of a process according to the present invention for producing two tissue webs from a single ply tissue web.

DEFINITIONS

As used herein the term "tissue web" generally refers to web, such as a sheet, that comprises a plurality of fibers and is suitable for use in forming a tissue product. Generally tissue webs have a sheet bulk greater than about 3.0 cubic centimeters per gram (cc/g) and more preferably greater than about 5.0 cc/g, such as from about 3.0 to about 20.0 cc/g. Non-limiting examples of processes for making tissue webs include known wet-laid papermaking processes and air-laid papermaking processes. Such processes that typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fiber slurry is then used to deposit a plurality of fibers onto a forming wire or belt such that an embryonic tissue web is formed, after which drying and/or bonding the fibers together results in a tissue web. Further processing the tissue web may be carried out such that a finished tissue web is formed. For example, in typical papermaking processes, the finished tissue web is the tissue web that is wound on the reel at the end of papermaking, and may subsequently be converted into a finished product, e.g. a tissue product.

As used herein, the term "tissue product" refers to products made from tissue webs and includes, bath tissues, facial tissues, paper towels, industrial wipers, foodservice wipers, napkins, medical pads, and other similar products. Tissue products may comprise one, two, three or more plies.

As used herein, the term "layer" refers to a plurality of strata of fibers, chemical treatments, or the like, within a ply.

As used herein, the terms "layered" or "multi-layered" generally refer to a tissue web prepared from two or more layers of aqueous papermaking furnish which are preferably comprised of different fiber types. The layers are preferably formed from the deposition of separate streams of dilute fiber slurries, upon one or more endless foraminous screens. If the individual layers are initially formed on separate foraminous screens, the layers are subsequently combined (while wet) to form a layered composite web. In certain preferred embodiments the invention provides multi-layered tissue webs consisting of three layers where the two outermost layers comprise a first fiber furnish and the middle fibrous layer comprises a second, different, fiber furnish.

As used herein the term "ply" refers to a discrete product element. Individual plies may be arranged in juxtaposition to each other. The term may refer to a plurality of web-like components such as in a multi-ply facial tissue, bath tissue, paper towel, wipe, or napkin.

As used herein, the term "debonders" generally refers to any chemical that diminishes the capability of papermaking fibers to hydrogen bond together, thereby reducing the strength of the resulting sheet and increasing perceived softness. Such chemical debonders include quaternary ammonium compounds, mixtures of quaternary ammonium compounds with polyhydroxy compounds, and modified polysiloxanes. Examples of quaternary ammonium compounds suitable for use in the present invention include dialkyldimethylammonium salts such as ditallow dimethyl ammonium chloride, ditallow dimethylammonium methyl sulfate, and di(hydrogenated)tallow dimethyl ammonium chloride.

Particularly suitable debonders are 1-methyl-2 noroleyl-3 oleyl amidoethyl imidazolinium methyl sulfate and 1-ethyl-2 noroleyl-3 oleyl amidoethyl imidazolinium ethylsulfate.

As used herein, the term "basis weight" generally refers to the bone dry weight per unit area of a tissue and is generally expressed as grams per square meter (gsm). Basis weight is measured using TAPPI test method T-220.

As used herein, the term "geometric mean tensile" (GMT) refers to the square root of the product of the machine direction tensile and the cross-machine direction tensile of the web, which are determined as described in the Test Method section.

As used herein, the term "caliper" is the representative thickness of a single sheet (caliper of tissue products comprising two or more plies is the thickness of a single sheet of tissue product comprising all plies) measured in accordance with TAPPI test method T402 using a ProGage 500

Thickness Tester (Thwing-Albert Instrument Company, West Berlin, N.J.). The micrometer has an anvil diameter of 2.22 inches (56.4 mm) and an anvil pressure of 132 grams per square inch (per 6.45 square centimeters) (2.0 kPa).

As used herein, the term "sheet bulk" refers to the quotient of the caliper (μm) divided by the bone dry basis weight (gsm). The resulting sheet bulk is expressed in cubic centimeters per gram (cc/g). Single ply webs that may be split according to the present invention generally have a sheet bulk greater than about 3.0 cubic centimeters per gram (cc/g) or greater, such as about 5.0 cc/g or greater, such as greater than about 8.0 cc/g, such as greater than about 10 cc/g, such as from about 3.0 to about 20.0 cc/g.

As used herein, the term "through-air dried" generally refers to a method of manufacturing a tissue web where a drying medium, such as heated air, is blown through a perforated cylinder, the embryonic tissue web and the fabric supporting the web. Generally the embryonic tissue web is supported by the fabric and is not brought into contact with the perforated cylinder.

As used herein, "noncompressive dewatering" and "noncompressive drying" refer to dewatering or drying methods, respectively, for removing water from tissue webs that do not involve compressive nips or other steps causing significant densification or compression of a portion of the web during the drying or dewatering process. In particularly preferred embodiments the wet web is wet-molded in the process of noncompressive dewatering to improve the softness and smoothness of the web with minimal degradation of tensile strength.

As used herein, the "splitting force" is the mean tensile force required to spit a sample of tissue web substantially horizontally into two halves. Splitting force is measured as set forth in the Test Methods section below. While the splitting force of webs prepared according to the present invention may vary, the webs generally have a splitting force less than about 250 gf so as to be readily split into two separate webs, which may be converted into a two ply tissue product.

As used herein the term "split basis weight difference" refers to the percent difference in the basis weight of two webs prepared from a single web as described herein. The split basis weight difference of the tissue webs may be, for instance, from about 0.5 to about 15 percent, such as from about 0.5 to about 5 percent.

DETAILED DESCRIPTION

In general, the present invention is directed to a process for producing multi-ply tissue products from a single ply tissue web and the resulting multi-ply products, which have good softness and strength characteristics. The process of the present invention generally involves producing a first single ply tissue web and then splitting the web into two separate single ply tissue webs that can be converted into a multi-ply web. In certain preferred embodiments the single ply web may be manufactured such that when it is split into two separate webs the two webs are substantially identical.

Tissue webs which may be split into two separate webs and thereafter converted into multi-ply tissue products that may be manufactured using any one of the well-known tissue manufacture processes. Particularly preferred are wet-laid tissue manufacturing processes and more preferable are wet-laid tissue manufacturing processes in which the tissue web is non-compressively dewatered. For example, in certain embodiments the tissue web is formed by a through-air drying process and be either creped or uncreped. For example, a papermaking process of the present disclosure can utilize adhesive creping, wet creping, double creping, embossing, wet-pressing, air pressing, through-air drying, creped through-air drying, uncreped through-air drying, as well as other steps in forming the paper web. Some examples of such techniques are disclosed in U.S. Pat. Nos. 5,048,589, 5,399,412, 5,129,988 and 5,494,554 all of which are incorporated herein in a manner consistent with the present disclosure.

In particularly preferred embodiments the tissue web to be split is formed by an uncreped through-air drying process. Useful uncreped through-air dried tissue processes are described for example, in U.S. Pat. Nos. 5,656,132 and 6,017,417, both of which are hereby incorporated by reference herein in a manner consistent with the present disclosure.

The physical properties of the basesheet may be varied depending on the desired properties of the resulting multi-ply tissue product. For example, the basis weight may range from about 20 to about 100 grams per square meter (gsm), such as from about 30 to about 80 gsm, such as from about 40 to about 60 gsm. The geometric mean tensile strength (GMT) is generally greater than about 500 g/3" and still more preferably greater than about 750 g/3" and more preferably greater than about 1,000 g/3". In certain embodiments GMT may range from about 500 to about 6,000 g/3", such as from about 750 to about 4,000 g/3", such as from about 1,000 to about 3,500 g/3", such as from about 1,000 to about 2,500 g/3". The caliper may range from about 500 to about 1,500 μm, such as from about 600 to about 1,200 μm and the sheet bulk may range from about 5.0 to about 20 cc/g, such as from about 8.0 to about 18.0 cc/g, such as from about 8.0 to about 15.0 cc/g.

In particularly preferred embodiments the basesheet is not subjected to surface treatments, such as the application of a lotion, or the like, prior to being split into two separate webs. In certain instances however, it may be desirable to calender the web prior to splitting it into two separate webs. For example, the basesheet may be calendered by passing the web through any one of the known calendering systems that apply certain pressure to the web as it passes through a nip between adjacent rolls, such as an adjacent steel roll and a roll having a rubberized coating. Without being bound by any particular theory, it is believed that calendering the web prior to splitting reduces the splitting force of the web and makes the web more susceptible to delamination and more readily split into two separate plies.

Further, it may be desirable to form the basesheet such that both outer surfaces are similar. While the surfaces may vary to some extent as a result of one surface contacting the papermaking fabric during manufacture—the fabric side—and the other being in contact with the atmosphere—the air side—it may be desirable to form the fibrous outer layers from the same fiber furnish and to manufacture the web such that the surface texture of the two surfaces is similar.

Typically the tissue web to be split is dried to a final dryness, such as a consistency greater than about 90 percent and more preferably greater than about 95 percent, prior to splitting. Unless sufficiently dry the web may not readily split into two substantially identical webs when peeled apart and passed over a splitting edge, as described in more detail below.

The manufacturing process may begin by providing a spirally wound roll 112 comprising the single ply tissue web 100 spirally wound around a core 110. In certain instances the spirally wound roll 112 may be a dried single ply tissue web directly wound from the tissue machine, often referred to in the art as a "parent roll." In other instance the spirally wound roll 112 may be formed by unwinding a web from a parent roll, slitting the web and rewinding the web about a core.

In certain embodiments the single ply tissue web may be calendered after being unwound from the spirally wound roll. For example, the single ply tissue web may be passed through a nip between a steel roll and a rubberized roll. Typically, depending on the amount of desired calender (or caliper reduction) and the type of calender rolls being used (hard or soft), loads in the range of between about 0 and 400 pounds per linear inch (pli) are applied, and more preferably loads between about 50 and 400 pli, and still more preferably from about 50 to about 150 pli. Typically the foregoing loads have a minimal adverse effect on the finished product attributes and tactile properties, but reduce the splitting force of the web such that it may be more readily separated into two separate webs.

As the web 100 is unwound it may be passed between a pair of rollers 131, 132, one or both of which may be driven, which may support the web as it is unwound. The web 100 generally comprises three layers—a pair of fibrous outer layers 105, 107 and a middle fibrous layer 106 disposed there between. The first outer layer 105 forms a first outer surface 101 and the second outer layer 107 forms a second outer surface 103. After passing though the pair of rollers 131, 132 the web 100 is split horizontally along a plane (M) substantially parallel to the outer surfaces 101, 103 of the web. Splitting the web 100 horizontally results in second and third single ply tissue webs 102, 104. The second and third single ply tissue webs 102, 104 each comprise two layers—a portion of the middle fibrous layer 106 and an outer layer 107. Each of the split webs 102, 104 have a first outer surface 111, 117 and a second outer surface 113, 119.

Initial splitting of the web 100 may be done by hand and then the split web may be threaded about the rollers 135, 136 and onto the respective cores 121, 123. The splitting of the web 100 into second and third single ply tissue webs 102, 104 may be controlled by moving a pair of vertically arranged idle rolls 135, 136 to vary the split angle (a). The split angle may be varied from about 15 to about 180 degrees, such as from about 30 to about 130 degrees, such as from about 60 to about 100 degrees.

The second and third single ply tissue webs 102, 104 may be diverted in different directions by a pair of spaced apart idler rolls 135, 136 and wound onto separated cores 121, 123 to form second and third wound rolls 116, 118. The second and third wound rolls 116, 118 may then be subjected to further converting such as surface treatment with a lotion or the like, slitting, winding, plying, calendering or embossing, to produce a final tissue product, such as a multi-ply tissue product comprising two or more plies.

In other instances the second and third webs may be directly converted into a multi-ply tissue product rather than first winding the webs into separate wound rolls. For example, after splitting the first tissue web into second and third tissue webs, the second and third tissue webs may be plied together using any suitable manner for laminating the webs together including, for example, crimping, embossing or adhering using an adhesive. In the final multi-ply tissue product it may be advantageous to orientate the individual plies such that the softest side is facing the consumer. For example, the second and third webs may be orientated such that the surface which originally comprised the middle of the original web forms the outer surface of the finished tissue product. However, in other embodiments it may be desirable to orient the webs such that the outer surfaces of the original web also form the outer surface of the final tissue product.

The process of the present disclosure simplifies the manufacture of multi-ply tissue products, which may contain two plies, three plies, or a greater number of plies, as a single base web may be produced by the tissue machine and subsequently split into multiple plies, which then may be recombined to form a multi-ply tissue product. Prior to, or after, combining the plies into a multi-ply product, the method of the present invention may comprise a number of further optional steps. For example, a surface additive, such as a lotion, may be applied by any suitable means, such as printing or spraying. The surface additive can either be applied to the plies or to the finished tissue product, either to the whole surface of the web or product or only to a portion thereof. For a multiple ply paper tissue product the lotion may be applied to all plies or only selected plies and to only one or to both surfaces of the plies. In one preferred embodiment lotion is applied to both outer surfaces of the individual plies before they are laminated together to form the finished tissue product.

In other embodiments one or both of the newly formed webs may be calendered by passing through a pair of calender rolls to achieve proper caliper and to improve the desired bulk and smoothness characteristics. After calendering, the webs may be brought into facing arrangement with one another and attached, such as by crimping, or the like, and slit by suitable slitters to a suitable width and wound into a wound multi-ply tissue product.

In still other embodiments one or both of the newly formed webs may be embossed, such as by passing the web(s) though a nip formed by a relatively soft (40 Shore A) roll and a hard roll which has an embossing pattern engraved thereon. Embossing may be used to improve the aesthetics of the finished tissue product and the structure of the tissue roll. After embossing, the webs may be brought into facing arrangement with one another and attached, such as by application of an adhesive, and slit by suitable slitters to a suitable width and wound into a wound multi-ply tissue product.

Regardless of the converting processes employed, it is generally preferred that to form the finished tissue product the first ply and the second ply are attached together. Any suitable manner for laminating the webs together may be used. For example, the process includes a crimping device that causes the plies to mechanically attach together through fiber entanglement. In an alternative embodiment, however, an adhesive may be used in order to attach the plies together.

As the multi-ply tissue products of the present invention are prepared by splitting a single ply web into two separate webs, it is generally preferred that the single ply web be susceptible to dividing into two halves and, in certain preferred embodiments, susceptible to dividing into two substantially identical halves. The ability of the single ply web to be split into two separate webs may be measured using the splitting force test described in the test methods section below. In certain instances the single ply web may have a mean splitting force of less than about 250 gf, such as less than about 200 gf, such as less than about 150 gf, such as less than about 100 gf, and, in one embodiment, from about 50 to about 250 gf, such as from about 100 to about 200 gf.

When a first single ply tissue web is split into two separate plies—second and third single ply tissue webs—the resulting plies may possess properties, such as basis weight, caliper, sheet bulk and surface texture, that are very similar to one another. For instance, the difference in basis weight between the second and third tissue webs may be less than about 10 percent, such as less than about 8 percent, such as less than about 5 percent. In other instances the difference in basis weight between the second and third tissue webs may range from about 2 to about 10 percent, such as from about 2 to about 5 percent. In still other instances the basis weight of the second and third tissue webs may be substantially equal, such as a difference of less than about 2 percent.

In certain instances the first single ply web may have a basis weight of from about 20 to about 100 gsm and may be split into second and third single ply webs, where the second and third single ply webs have a basis weight that is from 40 to about 60 percent of the first single ply web. In a particularly preferred embodiment the first single ply web is split substantially along a plane that runs through the center of the web. For instance, the tissue web may have a split basis weight difference of less than about 20 percent, such as less than about 15 percent, such as less than about 10 percent, and, in one embodiment, less than about 5 percent. The split basis weigh difference of the tissue webs may be, for instance, from about 0.5 percent to about 15 percent, such as from about 0.5 percent to about 5 percent.

Not only may the basis weights of the split webs be similar, the webs may also have similar caliper and sheet bulk. For instance, where the first single ply web is split substantially along a plane that runs through the center of the web the resulting second and third single ply webs may have similar caliper such that the difference in caliper between the second and third tissue webs may be less than about 10 percent, such as less than about 8 percent, such as less than about 5 percent. Similarly, the difference in sheet bulk between the second and third tissue webs may be less than about 10 percent, such as less than about 8 percent, such as less than about 5 percent.

In other instances the first single ply tissue web has substantially similar first and second outer surfaces and a uniform middle fibrous layer such that when it is split substantially along a plane that runs through the center of the web, the first outer surfaces of the second and third single ply webs are substantially similar and the second outer surfaces are also substantially similar.

To create two tissue webs from a first single ply tissue web it is generally preferred to prepare a single ply web having a plurality of layers where at least one of the layers is designed to facilitate splitting of the single ply web into two separate webs. For example, in one embodiment, the tissue web can be formed from multiple layers of fiber furnish, such as a web comprising three fibrous layers. In such embodiments the tissue web may comprise first and second outer layers and a middle fibrous layer disposed there between. Layered tissue webs produced by any means known in the art are within the scope of the present invention, including those disclosed in U.S. Pat. No. 5,494,554, the contents of which are incorporated hereby in a manner consistent with the present disclosure. In one preferred embodiment a tissue web comprising multiple fibrous layers is produced using a stratified headbox.

To facilitate splitting along a plane that runs through the middle fibrous layer of the web, the middle fibrous layer may be designed to be weaker than the fibrous outer layers. In certain embodiments the middle fibrous layer may be formed from fibers that have relatively poor inter-fiber bonding, such as high coarseness fibers, such as cellulosic fibers having a coarseness of greater than 17 mg/100, such as greater than about 19 mg/100 m, such as greater than about 21 mg/100 m, such as from about 17 to about 25 mg/100 m. High coarseness cellulosic fibers may include, for example, recycled fibers, Southern softwood kraft fibers, both bleached and unbleached, thermomechanical fibers and chemi-thermomechanical pulp fibers. In certain embodiments high coarseness cellulose fibers are selected from a group consisting of recycled fibers, chemi-thermomechanical fibers, Southern softwood kraft fibers, and mixtures thereof In one embodiment a weaker middle fibrous layer may be provided by forming a three layered tissue web having Southern softwood kraft fibers selectively disposed in the middle fibrous layer. Each outer layer can comprise from about 15 to about 40 percent by weight of the web and particularly can comprise about 20 to about 40 percent by weight of the web. The middle fibrous layer, however, can comprise from about 20 to about 70 percent by weight of the web, and particularly from about 25 to about 40 percent by weight of the web.

Southern softwood kraft fibers useful in the present invention are derived from pines in the *Pinus* subgenus. Suitable species within the *Pinus* subgenus include, for example, *P. taeda, P. elliotti, P. palustris, P. pungens, P. rigida, P. serotina, P. muricata* and *P. radiata*. Particularly preferred are *P. taeda, P. elliotti,* and *P. palustris*, and mixtures thereof. The outer layers may comprise Northern softwood kraft fibers or hardwood kraft fibers, or a mixture thereof. For example, the outer layers may comprise kraft pulp derived from redwood, red cedar, black spruce, *eucalyptus*, maple, birch, aspen, and the like.

In certain instances, the outer layers may comprise *eucalyptus* fibers to increase the softness of the web. *Eucalyptus* fibers may also be used in the outer layers to enhance the brightness, increase the opacity, and change the pore structure of the web to increase its wicking ability. Moreover, if desired, secondary fibers obtained from recycled materials may be used, such as fiber pulp from sources such as, for example, newsprint, reclaimed paperboard, and office waste.

In still other embodiments the outer layers may comprise Northern softwood kraft fibers that have been subjected to a moderate degree of refining to improve fiber-fiber boding. For example, the web may comprise a first outer layer consisting essentially of refined Northern softwood kraft fiber, a middle layer consisting essentially of unrefined Southern softwood kraft fibers and a second outer layer consisting essentially of refined Northern softwood kraft fiber. The first outer layer may comprise from about 20 to about 40 percent by weight of the web, the middle layer may comprise from 20 to about 60 percent by weight of the web and the second outer layer may comprise 20 to about 40 percent by weight of the web.

In other embodiments the middle layer can contain a mixture of Southern softwood kraft fibers and high-yield pulp fibers, such as bleached chemi-thermomechanical pulp (BCTMP) fibers. The BCTMP fibers can be present in the middle layer in an amount from about 10 to about 60 percent by weight of the middle layer, and particularly in an amount of from about 20 to about 50 percent by weight of the middle layer.

In still other embodiments the center layer of the first tissue web may be formed without a substantial amount of inner fiber-to-fiber bond strength. In this regard, the fiber furnish used to form the base web can be treated with a chemical debonding agent. The debonding agent can be added to the fiber slurry during the pulping process or can be added directly into the head box prior to formation of the wet tissue web. Suitable debonding agents that may be used in the present invention include cationic debonding agents, particularly quaternary ammonium compounds, mixtures of quaternary ammonium compounds with polyhydroxy compounds, and modified polysiloxanes.

Suitable cationic debonding agents include, for example, fatty dialkyl quaternary amine salts, mono fatty alkyl tertiary amine salts, primary amine salts, imidazoline quaternary salts, silicone quaternary salt and unsaturated fatty alkyl amine salts. Other suitable debonding agents are disclosed in U.S. Pat. No. 5,529,665, the contents of which are incorporated herein in a manner consistent with the present disclosure.

In one embodiment, the debonding agent used in the process of the present invention is an organic quaternary ammonium chloride and particularly a silicone based amine salt of a quaternary ammonium chloride. Useful debonders are commercially available under the tradename ProSoft from Solenis (Wilmington, Del.). The debonding agent can be added to the fiber slurry in an amount of from about 1.0 kg per metric tonne to about 15 kg per metric tonne of fibers present within the slurry.

Particularly useful quaternary ammonium debonders include imidazoline quaternary ammonium debonders, such as oleyl-imidazoline quaternaries, dialkyl dimethyl quaternary debonders, ester quaternary debonders, diamidoamine quaternary debonders, and the like. The imidazoline-based debonding agent can be added in an amount of between 2.0 to about 15 kg per metric tonne.

In still other embodiments a tissue web having a weaker middle layer may be manufactured by producing a stratified web having high-yield pulp fibers selectively disposed in the center of the web. High-yield pulp fibers are typically lignin-rich cellulosic pulps or fibers having relatively high coarseness and poor bonding produced by processes such as thermomechanical pulping (TMP), chemithermomechanical pulping (CTMP) as well as bleached chemithermomechanical pulp (BCTMP) and alkaline peroxide mechanical pulp (APMP). Such pulps generally have a lignin content of at least about 5 percent and usually more than about 10 percent and typically more than about 15 percent up to about 30 percent or more. Especially preferred in some embodiments are TMP, CTMP, BCTMP and APMP having lignin contents of from about 15 up to about 25 percent.

In certain embodiments the first single ply web may comprise a three layered tissue web having first and second outer layers and a middle layer disposed there between where the middle layer consists essentially of high-yield pulp fibers and the two outer layers consist essentially of hardwood or softwood kraft pulp fibers. For example, in one particular embodiment of the present invention, the paper web contains outer layers made from softwood fibers. Each outer layer can comprise from about 20 to about 40 percent by weight of the web and particularly can comprise about 25 percent by weight of the web. The middle layer, however, can comprise from about 40 to about 60 percent by weight of the web, and particularly about 50 percent by weight of the web. The middle layer can contain a mixture of softwood fibers and BCTMP fibers. The BCTMP fibers can be present in the middle layer in an amount from about 40 to about 60 percent by weight of the middle layer, and particularly in an amount of about 50 percent by weight of the middle layer.

In yet other embodiments the first single ply web may comprise a stratified web where the middle layer comprises cross-linked cellulosic fibers which sufficiently weaken the middle layer and facilitate splitting. Suitable crosslinked fibers and tissue structure are described in PCT Application No. PCT/US2016/035056, which is incorporated herein in a manner consistent with the present disclosure. In one particularly preferred embodiment the first single ply tissue web comprises first and second outer layers and a middle layer disposed there between where the middle layer comprises crosslinked cellulosic fibers and the two outer layers consist essentially of hardwood or softwood kraft pulp fibers. For example, the cross-linked cellulosic fibers may comprise cross-linked-*eucalyptus* hardwood kraft pulp fibers (EHWK) which may be selectively incorporated in the middle layer of a three-layered tissue structure where the two outer layers comprise non-cross-linked cellulosic fibers, such as non-cross-linked Northern softwood kraft fiber (NSWK). In further embodiments it may be preferred that the two outer layers be substantially free from cross-linked-cellulosic fiber, such as cross-linked EHWK.

In another embodiment, a layer or other portion of the web, including the entire web, can be provided with wet or dry strength agents. As used herein, "wet strength agents" are materials used to immobilize the bonds between fibers in the wet state. Any material that when added to a paper web or sheet at an effective level results in providing the sheet with a wet geometric tensile strength:dry geometric tensile strength ratio in excess of 0.1 will, for purposes of this invention, be termed a wet strength agent. Typically these materials are termed either as permanent wet strength agents or as "temporary" wet strength agents. For the purposes of differentiating permanent from temporary wet strength, permanent will be defined as those resins which, when incorporated into paper or tissue products, will provide a product that retains more than 50 percent of its original wet tensile strength after exposure to water for a period of at least five minutes. Temporary wet strength agents are those which show less than 50 percent of their original wet strength after being saturated with water for five minutes. Both classes of material find application in the present invention. The amount of wet strength agent or dry strength added to the pulp fibers can be at least about 0.1 dry weight percent, more specifically about 0.2 dry weight percent or greater, and still more specifically from about 0.1 to about 3 dry weight percent, based on the dry weight of the fibers.

Particularly preferred wet strength agents include resin binder materials selected from the group consisting of polyamide-epichlorohydrin resins, polyacrylamide resins, and mixtures thereof. Of particular utility are the various polyamide-epichlorohydrin resins. These materials are low molecular weight polymers provided with reactive functional groups such as amino, epoxy, and azetidinium groups. Particularly useful polyamide-epichlorohydrin resins include those marketed under the tradename KYMENE (Solenis, Wilmington, Del.).

Useful dry strength additives include carboxymethyl cellulose resins, starch based resins, and mixtures thereof. Examples of preferred dry strength additives include carboxymethyl cellulose, and cationic polymers from the ACCO chemical family (American Cyanamid Company of Wayne, N.J.) such as ACCO 711 and ACCO 514.

Suitable temporary wet strength resins include, but are not limited to, those resins that have been developed by American Cyanamid and are marketed under the name PAREZ™ 631 NC wet strength resin (now available from Cytec Industries, located in West Paterson, N.J.). This and similar resins are described in U.S. Pat. Nos. 3,556,932 and 3,556,933, Other temporary wet strength agents that should find application in this invention include modified starches such as those available from National Starch and marketed as CO BOND™ 1000 modified starch.

Although wet strength agents as described above find particular advantage for use in connection with this invention, other types of bonding agents can also be used to provide the necessary wet resiliency. They can be applied at the wet end of the basesheet manufacturing process or applied by spraying or printing after the basesheet is formed or after it is dried.

According to the process of the current invention, numerous and different tissue products can be formed. For instance, the tissue products may be, for instance, facial tissues, bath tissues, paper towels, napkins, industrial wipers, and the like. The basis weight can range anywhere from about 20 to about 80 gsm, such as from about 25 to about 60 gsm, such as from about 30 to about 50 gsm. In one particular embodiment, the present invention is directed to the production of a two ply rolled bath tissue product having a basis weight of from about 35 to about 45 gsm.

Tissue products made according to the present invention may have a relatively high bulk. Tissue products made in accordance with the present invention, for instance, may have a bulk greater than 5.0 cc/g. For example, in one embodiment, the bulk of tissue products made according to the present invention can be greater than about 8.0 cc/g, such as greater than about 10.0 cc/g, such as greater than about 10 cc/g, such as from about 5.0 to about 18.0 cc/g, such as from about 8.0 to about 15.0 cc/g.

Generally the multi-ply products of this invention derive their sheet bulk referred to above from the basesheet, which is the sheet produced by the tissue machine without post treatments such as embossing. Nevertheless, the basesheets of this invention can be embossed to produce even greater bulk or aesthetics, if desired, or they can remain unembossed. In addition, the basesheets of this invention can be calendered to improve smoothness or decrease the bulk if desired or necessary to meet existing product specifications. In other instances the basesheet may be uncalendered and the resulting split webs may be calendered to improve smoothness or decrease the bulk if desired or necessary to meet existing product specifications.

Further, the tensile strength, such as the geometric mean tensile strength (GMT), of the tissue product may be varied depending on its intended end use. For example, the multi-ply tissue product may have a GMT greater than about 500 g/3", such as greater than about 700 g/3", such as greater than about 1,000 g/3", such as from about 500 to about 4,000 g/3", such as from about 700 to about 3,000 g/3". In certain preferred embodiments the multi-ply tissue product is a rolled bath tissue product having a GMT from about 700 to about 1,500 g/3".

TEST METHODS

Tensile

Samples for tensile strength testing are prepared by cutting a 3-inch (76.2 mm) wide×5-inch (127 mm) long strip in either the machine direction (MD) or cross-machine direction (CD) orientation using a JDC Precision Sample Cutter (Thwing-Albert Instrument Company, Philadelphia, Pa., Model No. JDC 3-10, Ser. No. 37333). The instrument used for measuring tensile strengths is an MTS Systems Sintech 11S, Serial No. 6233. The data acquisition software is MTS TestWorks™ for Windows Ver. 4 (MTS Systems Corp., Research Triangle Park, N.C.). The load cell is selected from either a 50 Newton or 100 Newton maximum, depending on the strength of the sample being tested, such that the majority of peak load values fall between 10 and 90 percent of the load cell's full scale value. The gauge length between jaws is 2±0.04 inches (50.8±1 mm). The jaws are operated using pneumatic-action and are rubber coated. The minimum grip face width is 3 inches (76.2 mm), and the approximate height of a jaw is 0.5 inches (12.7 mm). The crosshead speed is 10±0.4 inches/min (254±1 mm/min), and the break sensitivity is set at 65 percent. The sample is placed in the jaws of the instrument, centered both vertically and horizontally. The test is then started and ends when the specimen breaks. The peak load is recorded as either the "MD tensile strength" or the "CD tensile strength" of the specimen depending on the sample being tested. At least six (6) representative specimens are tested for each product, taken "as is," and the arithmetic average of all individual specimen tests is either the MD or CD tensile strength for the product.

In addition to tensile strength, the stretch, tensile energy absorbed (TEA), and slope are also reported by the MTS TestWorks™ program for each sample measured. Stretch (either MD stretch or CD stretch) is reported as a percentage and is defined as the ratio of the slack-corrected elongation of a specimen at the point it generates its peak load divided by the slack-corrected gauge length. Slope is reported in the units of grams (g) and is defined as the gradient of the least-squares line fitted to the load-corrected strain points falling between a specimen-generated force of 70 to 157 grams (0.687 to 1.540 N) divided by the specimen width.

Total energy absorbed (TEA) is calculated as the area under the stress-strain curve during the same tensile test as has previously been described above. The area is based on the strain value reached when the sheet is strained to rupture and the load placed on the sheet has dropped to 65 percent of the peak tensile load. For the TEA calculation, the stress is converted to grams per centimeter and the area calculated by integration. The units of strain are centimeters per centimeter so that the final TEA units become g*cm/cm2.

Splitting Force

A TAPPI conditioned web is cut in the machine-direction of the one-ply basesheet that is to be split using a JDC Precision Sample Cutter (Thwing-Albert Instrument Company, Philadelphia, Pa., Model No. JDC 3-10, Ser. No. 37333) to yield a 76.2 mm (3-inch) wide strip at least 177.8 mm (seven inches) long. Using adhesive tape on opposing sides at one end of the strip, splitting is initiated and the strip is split along about a 76.2 mm (3-inch) long section. The ends of the two split portions are placed in and centered in opposing pneumatically operated jaws of the test instrument. The instrument used for measuring the force to split the one ply basesheet is an MTS Systems Sintech 11S, Serial No. 6233. The data acquisition software is MTS TestWorks™ for Windows Ver. 4 (MTS Systems Corp., Research Triangle Park, N.C.).

The tensile test device was configured with an initial jaw span of 25.4 mm (1 inch) (gage length) and set to a crosshead speed of 300 mm (12-inches) per minute. One split layer was first placed in the upper jaw, and then the opposing split layer was placed in the lower jaw, such that the line of separation (the region where the two split portions come together into an unsplit web) was roughly midway between the two jaws, with the line of separation being substantially horizontal. The web was loaded into the jaws such that the tensile force was less than 3 gf and typically essentially zero grams of force prior to initiation of the test. The test was initiated, and as the crossheads moved apart, a 50 N load cell was used to measure the tensile force required to further split the web. The test is continued over at least 50.8 mm (two inches) and, when possible, exactly 88.9 mm (3.5 inches) of crosshead motion. The measured mean separation force is the "splitting force".

EXAMPLES

Example 1

Basesheets, also referred to herein as the first single ply tissue web, were made using a through-air dried papermaking process commonly referred to as "uncreped through-air dried" ("UCTAD") and generally described in U.S. Pat. No. 5,607,551, the contents of which are incorporated herein in a manner consistent with the present invention. Basesheets with a target bone dry basis weight of about 45 grams per square meter (gsm) were produced.

In all cases the basesheets were produced from a furnish comprising Northern softwood kraft (NSWK) and Southern softwood kraft (SSWK) using a layered headbox fed by three stock chests such that the web had three layers (two outer layers and a middle layer). The first outer layer, which corresponded to the surface of the web not brought into contact with the papermaking fabrics during manufacture, comprised NSWK and was 30 percent by weight of the total web. The middle layer comprised SSWK and was 40 percent by total weight of the total web. The second outer layer, which corresponded to the surface of the web brought into contact with the papermaking fabrics during manufacture, comprised NSWK and was 30 percent by weight of the total web. Strength was controlled via the addition of carboxymethyl cellulose (CMC), Kymene and/or by refining the NSWK furnish as set forth in Table 1, below.

TABLE 1

| Layer | Weight % | Fiber Type | Refining (Hp-day/MT) | CMC (kg/MT) | Kymene (kg/MT) | Debonder (kg/MT) |
|---|---|---|---|---|---|---|
| First Outer | 30 | NSWK | 0.6 | 1.0 | 3.0 | — |
| Middle | 40 | SSWK | No | 1.0 | 3.0 | 7.5 |
| Second Outer | 30 | NSWK | 0.6 | 1.0 | 3.0 | — |

The tissue web was formed on a Voith Fabrics TissueForm V forming fabric, vacuum dewatered to approximately 25 percent consistency and then subjected to rush transfer when transferred to the transfer fabric. The degree of rush transfer was 15 percent. The transfer fabric was the fabric described as t807-5 (commercially available from Voith Fabrics, Appleton, Wis.).

The web was then transferred to a through-air drying fabric. The through-air drying fabric was the fabric described as t1205-2 (commercially available from Voith Fabrics, Appleton, Wis.). Transfer to the through-drying fabric was done using vacuum levels of greater than 10 inches of mercury at the transfer. The web was then dried to approximately 98 percent solids before winding.

The first single ply web was subsequently unwound and split by hand. The resulting second and third tissue plies were plied together by hand to form a two ply tissue product. The physical properties of the first single ply web and the resulting two-ply tissue product are summarized in Table 2, below.

TABLE 2

| | First Single Ply Web | Multi-ply Product | Delta |
|---|---|---|---|
| GMT (g) | 2247 | 1572 | −30.0% |
| MD/CD | 1.48 | 1.63 | 10.2% |
| MD (g) | 2733 | 2007 | −26.6% |
| MD Stretch (%) | 11.71 | 10.51 | −10.2% |
| MD Slope (kg) | 24.60 | 14.51 | −41.0% |
| MDTEA (g*cm/cm$^2$) | 22.96 | 13.87 | −39.6% |
| CD (g) | 1847 | 1231 | −33.3% |
| CD Stretch (%) | 9.43 | 7.21 | −23.5% |
| CD Slope (kg) | 8.66 | 7.74 | −10.6% |
| CDTEA (g*cm/cm$^2$) | 9.11 | 4.70 | −48.4% |

Example 2

Basesheet having a target basis weight of 39 gsm was prepared using an UCTAD process substantially as described in Example 1, with the exception that a t1207-11 transfer fabric (commercially available from Voith Fabrics, Appleton, Wis.) and a t2301-11 through-air drying fabric (commercially available from Voith Fabrics, Appleton, Wis.) were used and the wet web was subjected to 20 percent rush transfer when transferred from the transfer fabric to the through-air drying fabric. Strength was controlled via the addition of carboxymethyl cellulose (CMC), Kymene and/or by refining the NSWK furnish as set forth in Table 3, below.

TABLE 3

| Layer | Weight % | Fiber Type | Refining (Hp-day/MT) | CMC (kg/MT) | Kymene (kg/MT) | Debonder (kg/MT) |
|---|---|---|---|---|---|---|
| First Outer | 30 | NSWK | 4.0 | 3.0 | 9.0 | — |
| Middle | 40 | SSWK | No | 0 | 0 | 5.5 |
| Second Outer | 30 | NSWK | 4.0 | 3.0 | 9.0 | — |

The basesheet was initially wound as a parent roll after being manufactured and then unwound on an experimental converting line. The sheet was initially split by hand and threaded by hand through the converting apparatus. Once split and threaded, the converting line was run at 100 meters per minute (mpm) to produce a rolled two-ply tissue product with a diameter of 114 mm, a sheet count of 89 sheets and a sheet length of 152 mm. The physical properties of the first single ply web and the resulting two-ply tissue product are summarized in Table 4, below.

TABLE 4

|  | First Single Ply Web | Multi-ply Product | Delta |
|---|---|---|---|
| Basis Weight (qsm) | 38.4 | 36.6 | −4.8% |
| GMT (g) | 3044 | 2254 | −26.0% |
| MD/CD | 1.12 | 1.33 | 18.8% |
| MD (g) | 3226 | 2603 | −19.3% |
| MD Stretch (%) | 15.8 | 13.30 | −15.8% |
| MD Slope (kg) | 23.65 | 14.87 | −37.1% |
| MDTEA (q*cm/cm$^2$) | 36.7 | 22.78 | −37.9% |
| CD (g) | 2872 | 1951 | −32.1% |
| CD Stretch (%) | 11.2 | 8.86 | −20.9% |
| CD Slope (kg) | 9.15 | 9.56 | 4.5% |
| CDTEA (g*cm/cm$^2$) | 15.3 | 9.55 | −37.6% |

Example 3

The basesheet of this example was made as per example 1 but with 20 percent rush transfer to the through-air drying fabric, and with a target basis weight of about 60 gsm. Strength was controlled via the addition of carboxymethyl cellulose (CMC), Kymene and/or by refining the NSWK furnish as set forth in Table 5, below.

TABLE 5

| Layer | Weight % | Fiber Type | Refining (Hp-day/MT) | CMC (kg/MT) | Kymene (kg/MT) | Debonder (kg/MT) |
|---|---|---|---|---|---|---|
| First Outer | 30 | NSWK | 2.0 | 3.0 | 9.0 | — |
| Middle | 40 | SSWK | No | 0 | 0 | 12.0 |
| Second Outer | 30 | NSWK | 2.0 | 3.0 | 9.0 | — |

The basesheet was initially wound as a parent roll after being manufactured and then unwound on an experimental converting line. The sheet was initially split by hand and threaded by hand through the converting apparatus. Once split and threaded, the converting line was run at 100 mpm to produce a rolled two-ply tissue product with a diameter of 114 mm, a sheet count of 77 sheets and a sheet length of 152 mm. The physical properties of the first single ply web and the resulting two-ply tissue product are summarized in Table 6, below.

TABLE 6

|  | First Single Ply Web | Multi-ply Product | Delta |
|---|---|---|---|
| Basis Weight (gsm) | 60.5 | 58.1 | −4.0% |
| GMT (g) | 4430 | 3642 | −17.8% |
| MD/CD | 1.14 | 1.31 | 14.9% |
| MD (g) | 4729 | 4172 | −11.8% |
| MD Stretch (%) | 16.7 | 14.84 | −11.1% |
| MD Slope (kg) | 25.76 | 15.66 | −39.2% |
| MDTEA (g*cm/cm$^2$) | 52.2 | 37.13 | −28.9% |
| CD (g) | 4150 | 3179 | −23.4% |
| CD Stretch (%) | 8.8 | 7.86 | −10.7% |
| CD Slope (kg) | 18.36 | 12.41 | −32.4% |
| CDTEA (g*cm/cm$^2$) | 18.5 | 13.02 | −29.6% |

Basesheets prepared according to Examples 2 and 3 above, were evaluated for split basis weight difference and mean splitting force, the results of which are summarized in Table 7, below.

TABLE 7

|  | Basesheet Basis Weight (gsm) | First Split Web Basis Weight (gsm) | Second Split Web Basis Weight (gsm) | Split Web Basis Weight Difference (%) | Mean Splitting Force (gf) |
|---|---|---|---|---|---|
| Example 2 | 38.4 | 17.9 | 18.7 | 4 | 168 |
| Example 3 | 60.5 | 27.9 | 30.2 | 8 | 132 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto and the following embodiments:

In a first embodiment the present invention provides a method for manufacturing a multi-ply tissue product comprising the steps of forming a first multi-layered tissue web comprising first and second fibrous outer layers and a middle layer disposed there between; splitting the first multi-layered tissue web horizontally to form a second and a third multi-layered tissue web, wherein the second and the third multi-layered tissue webs each comprise two layers; and plying the second and third multi-layered tissue webs together to form a multi-ply tissue product.

In a second embodiment the present invention provides the method of the first embodiment wherein the first and second fibrous outer layers comprise wood pulp fibers selected from Northern softwood kraft fibers and hardwood kraft fibers, and mixtures thereof, and the middle layer comprises wood pulp fibers selected from Southern softwood kraft fibers, high-yield pulp fibers and cross-linked fibers, and mixtures thereof.

In a third embodiment the present invention provides the method of the first or second embodiments wherein the middle layer further comprises a debonder comprising an imidazoline quaternary compound, an ester-functional quaternary ammonium compound, or mixtures thereof.

In a fourth embodiment the present invention provides the method of any one of the first through the third embodiments further comprising the step of converting the plied tissue product wherein the converting comprises treating the plied tissue product with a lotion, or the like, slitting, winding, calendering or embossing, to produce a final tissue product.

In a fifth embodiment the present invention provides the method of any one of the first through the fourth embodiments wherein the finished tissue product has a basis weight from about 20 to about 80 gsm and a geometric mean tensile strength from about 1,000 to about 4,000 g/3".

In a sixth embodiment the present invention provides the method of any one of the first through the fifth embodiments wherein the first multi-layered tissue web is split horizontally substantially about the midpoint of the web.

In a seventh embodiment the present invention provides the method of any one of the first through the sixth embodiments wherein the first multi-layered tissue web has a splitting force from about 100 to about 250 gf.

In an eighth embodiment the present invention provides the method of any one of the first through the seventh embodiments wherein the first multi-layered tissue web has a basis weight from about 20 to about 80 grams per square meter (gsm) and a sheet bulk greater than about 5 cubic centimeters per gram (cc/g).

In a ninth embodiment the present invention provides the method of any one of the first through the eighth embodiments wherein the second and a third multi-layered tissue webs having a basis weight from about 10 to about 40 gsm and a split basis weight difference less than about 10 percent.

In a tenth embodiment the present invention provides the method of any one of the first through the ninth embodiments further comprising the step of calendering the first multi-layered tissue web.

What is claimed is:

1. A method for manufacturing a multi-ply tissue product comprising the steps of:
    a. providing first and second vertically arranged rollers;
    b. forming a first multi-layered tissue web comprising first and second fibrous outer layers and a middle fibrous layer disposed there between;
    c. splitting the first multi-layered tissue web horizontally to form a second and a third multi-layered tissue web, wherein the second and the third multi-layered tissue webs each comprise two fibrous layers;
    d. threading the second multi-layered tissue web about the first roller and threading the third multi-layered tissue web about the second roller thereby forming a split angle ranging from 15 to 180 degrees between the second and third multi-layered tissue webs; and
    e. plying the second and third multi-layered tissue webs together to form a multi-ply tissue product.

2. The method of claim 1 wherein the first and second fibrous outer layers comprise wood pulp fibers selected from the group consisting of Northern softwood kraft fibers and hardwood kraft fibers, and mixtures thereof, and the middle fibrous layer comprises wood pulp fibers selected from Southern softwood kraft fibers, high-yield pulp fibers and cross-linked fibers, and mixtures thereof.

3. The method of claim 2 wherein the middle fibrous layer further comprises a debonder selected from the group consisting of an imidazoline quaternary compound, an ester-functional quaternary ammonium compound, and mixtures thereof.

4. The method of claim 3 wherein the debonder is applied in an amount from about 2.0 to about 15.0 kilograms (kg) per metric tonne of fiber furnish.

5. The method of claim 1 wherein the first multi-layered tissue web is split horizontally substantially about the midpoint of the web.

6. The method of claim 1 wherein the first multi-layered tissue web has a splitting force from about 100 to about 250 grams of force (gf).

7. The method of claim 1 wherein the first multi-layered tissue web has a basis weight from about 20 to about 80 grams per square meter (gsm) and a sheet bulk greater than about 5 cubic centimeters per gram (cc/g).

8. The method of claim 1 wherein the second and a third multi-layered tissue webs have a basis weight from about 10 to about 40 gsm and a split basis weight difference less than about 10 percent.

9. A method for manufacturing a two ply tissue product comprising the steps of:
    a. providing an uncreped through-air dried tissue web comprising first and second fibrous outer layers and a middle fibrous layer disposed there between;
    b. splitting the uncreped through-air dried web horizontally to form a second and a third multi-layered tissue web, wherein the second and the third multi-layered tissue webs each comprise two layers;
    c. threading the second multi-layered tissue web about a first roller and threading the third multi-layered tissue web about a second roller thereby forming a split angle between the second and third multi-layered tissue webs;
    d. varying the split angle from 15 to 180 degrees by adjusting the position of the first and second rollers relative to one another; and
    e. plying the second and third multi-layered tissue webs together to form a two ply tissue product.

10. The method of claim 9 wherein the first and second outer layers comprise wood pulp fibers selected from Northern softwood kraft fibers and hardwood kraft fibers, and mixtures thereof, and the middle fibrous layer comprises wood pulp fibers selected from Southern softwood kraft fibers, high-yield pulp fibers and cross-linked fibers, and mixtures thereof.

11. The method of claim 9 wherein the middle fibrous layer further comprises a debonder selected from the group consisting of an imidazoline quaternary compound, an ester-functional quaternary ammonium compound, or mixtures thereof.

12. The method of claim 11 wherein the debonder is applied in an amount from about 2.0 to about 15.0 kilograms (kg) per metric tonne of fiber furnish.

13. The method of claim 9 wherein the first multi-layered tissue web is split horizontally substantially about the midpoint of the web.

14. The method of claim 9 wherein the first multi-layered tissue web has a splitting force from about 100 to about 250 grams of force (gf).

15. The method of claim 9 wherein the first multi-layered tissue web has a basis weight from about 20 to about 80 grams per square meter (gsm) and a sheet bulk greater than about 5 cubic centimeters per gram (cc/g).

16. The method of claim 9 wherein the second and a third multi-layered tissue webs have a basis weight from about 10 to about 40 gsm and a split basis weight difference less than about 10 percent.

* * * * *